Patented Dec. 25, 1934

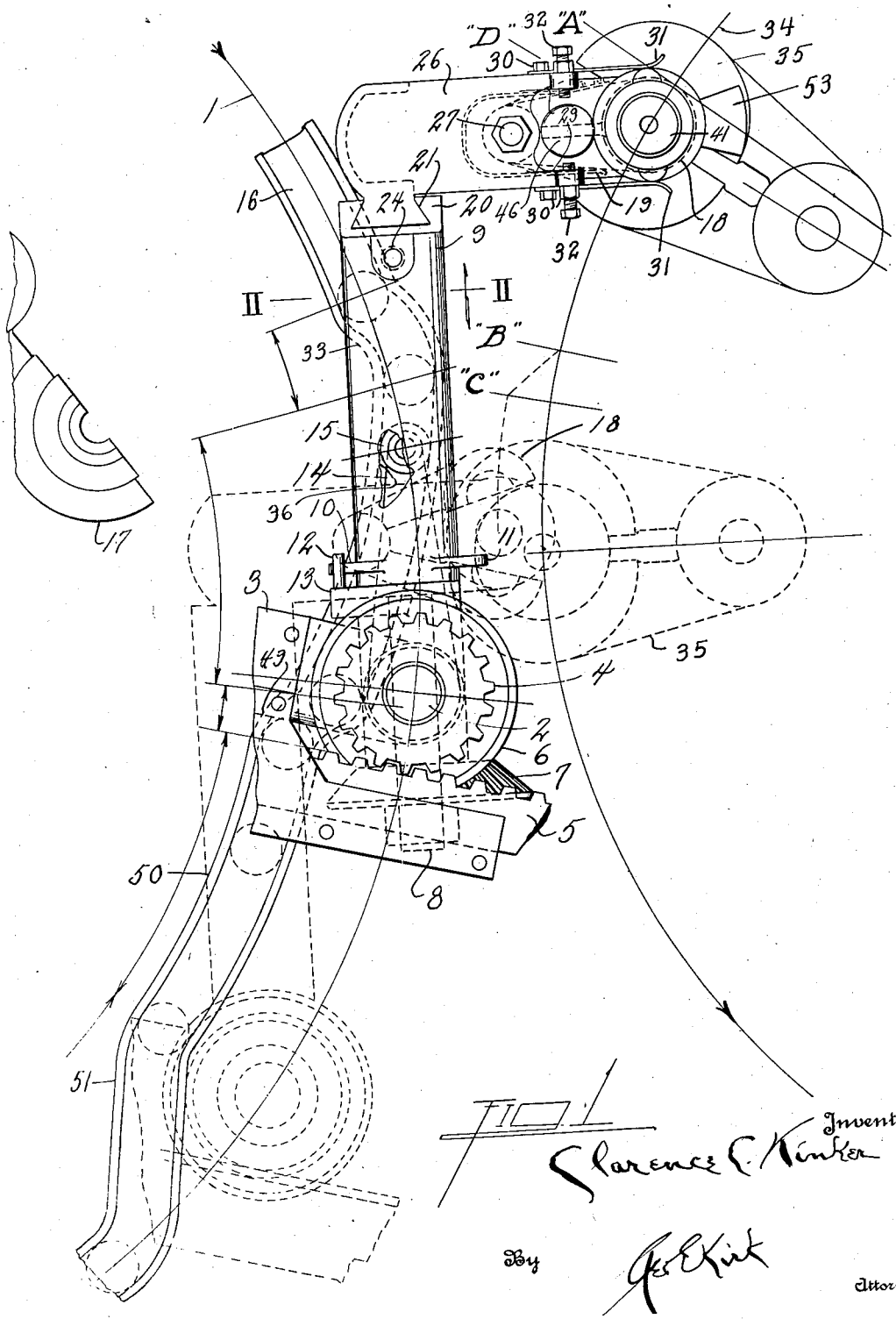

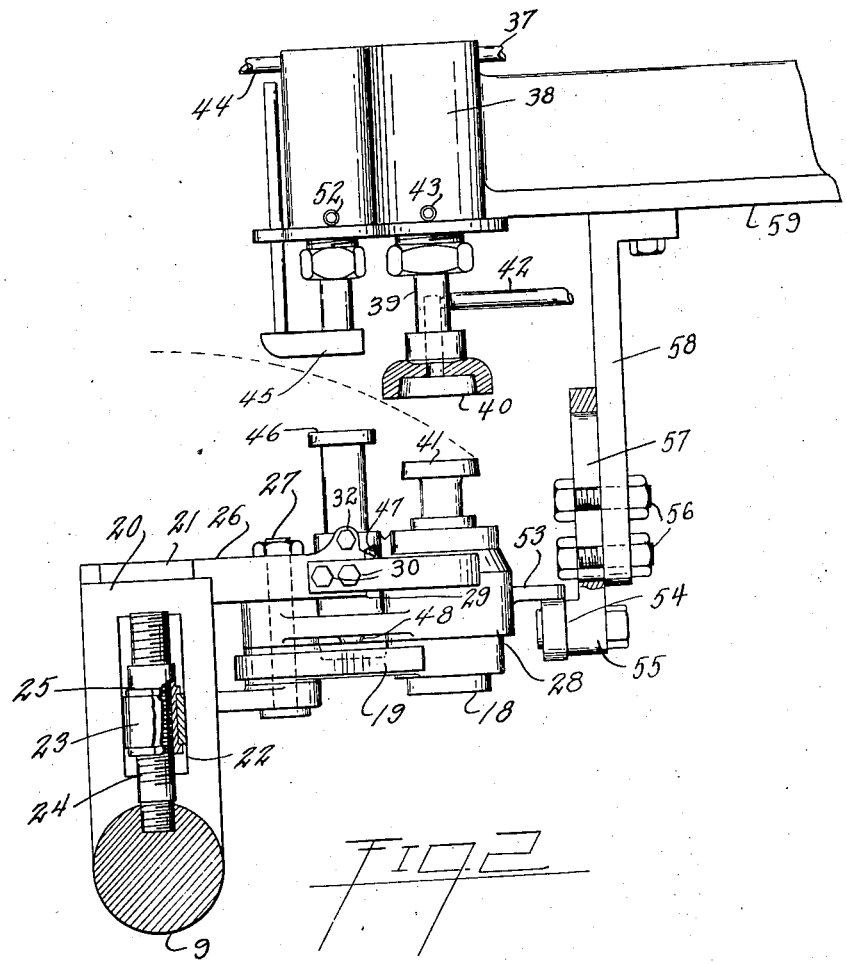

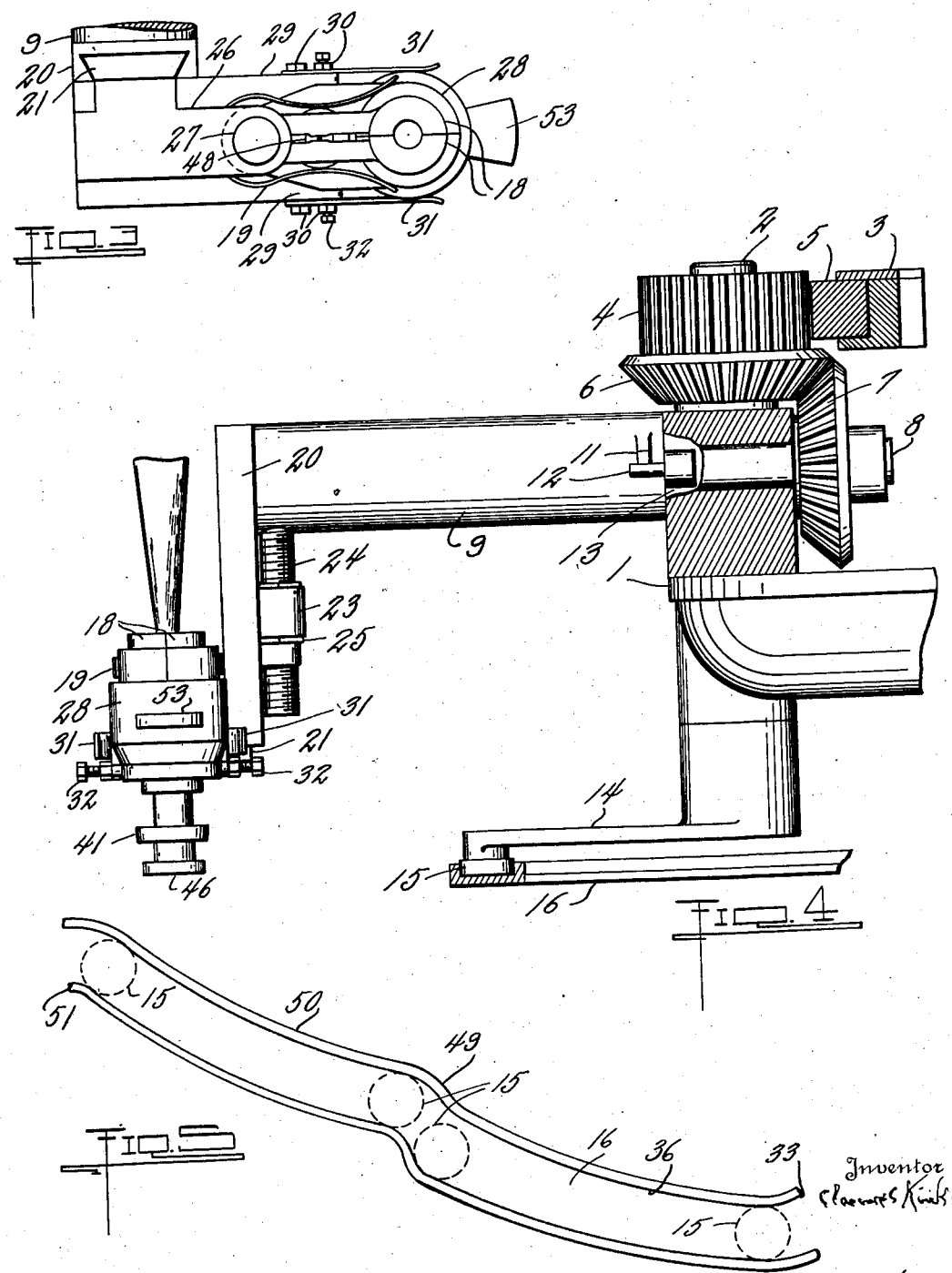

1,985,416

UNITED STATES PATENT OFFICE 1,985,416

GLASS BLANK TRANSFER

Clarence C. Kinker, Toledo, Ohio, assignor, by mesne assignments, to Hartford-Empire Company, Hartford, Conn., a corporation of Delaware Application August 1, 1929, Serial No. 382,667

9 Claims. (Cl. 49—9)

This invention relates to glass forming machines, more particularly of the two table type, wherein the blank or parison is formed upon one table and such blank is transferred to the laterally adjacent table, wherein the ware is finished by final blowing as to bottle form.

This invention has utility in transfer mechanism between the tables, especially for orienting the blank between the tables and insuring angular lineal travel of portions of the transfer device with the closed mold of the blow table.

Referring to the drawings:

Fig. 1 is a fragmentary view in plan and partially diagrammatic, showing features of the invention as adapted to apparatus such as shown in Patent 1,705,341, March 12, 1929, Glass blowing machine by Leonard D. Soubier;

Fig. 2 is a section partially on the line II—II, Figure 1, showing in addition features for holding and taking a strain in connection with such holding for the angular and lineal travel coincidence;

Fig. 3 is a plan view of the neck mold in closed position;

Fig. 4 is a fragmentary view of the neck mold and its arm before orienting to suspend the blank; and Fig. 5 is a detail of a portion of the cam track.

Blank mold table has arc 1 of travel for shaft 2 as held by bracket 3. Fixedly mounted on shaft 2 is gear 4 actuable by radially shiftable rack 5. This gear 4 has fixed therewith bevel gear 6 in mesh with bevel gear 7 on shaft 8 for oscillating arm 9 provided with stops 10, 11, swingable against fixed pin 12 on housing 13 as a bearing about the shaft 2 for the gears 4, 6. Depending below the bracket portion 3 of the blank table and fixed with the bearing or block 13 is arm 14 trailing from the block 13 in the direction of the arm 9 and therebelow. This arm 14 terminally carries roller 15 coacting in fixed cam way 16 approximating the line of travel for the shaft 2 in the blank table rotation as carrying partible or sectional blank molds 17.

The travel of the blank mold table, which may be continuous during the operation of the machine, is effective for bringing the blank molds carried thereby successively into such position that they may receive a charge of molten glass and thereafter form the same into a blank or parison. Such travel may be effective, as described for example in the Soubier patent referred to, for causing the blank molds to open successively, thereby leaving the blanks upstanding from partible neck mold sections 18 yieldably held in closed position by leaf spring 19. This rack 5 is then given a longitudinal movement thereby to orient or invert the blank by oscillating the arm 9 approximately 180°. This arm 9 terminally carries guide way 20 for dove-tail 21. The guide 20 has opening 22 therein, through which protrudes arm 23 engageable by threaded element 24 anchored with the arm 9. Between this arm or lug 23 and the threaded member 24 is nut 25, swiveled with the arm 23 and as rotated relatively to the member 24, effective for adjusting angular extension 26 fixed with the dove-tail block 21.

This extension 26 has pivot pin 27 mounting the neck finish mold sections 18, and additionally pivotally mounting nipple box or fitting 28. Cheeks 29 have bolts 30 holding leaf springs 31 oppositely engaging the box device 28 for yieldably maintaining such in alignment with the extension 26. However, this arm extension is thus yieldable for movement relatively to the arm 9, the extent of which movement may be positively determined by set screws 32.

As the orienting operation has occurred to bring the blank from upstanding position in the vicinity of the blank table to depending position, the cam 16 merges into cam portion 33 in shifting the depending blank into the vicinity of blow mold arc of travel 34 for one of the partible or sectional blow molds 35 to close thereabout. The region of this entrance of the suspended blank into the blow mold may be between "A" and "D" along the arc of travel 34. The continuation of the travel of the roller 15 from the cam 33 is into cam region 36 approximating the angular travel "D" to "B" with slight angular play for the roller 15 as to the shaft 2.

The purpose of this is to take care of lineal and angular disturbance as to the travel of the closed blow mold 35 as closed at "D", because of the greater radius of the closed neck finish mold 18 as mounted to travel with the blank table, with such blank and blow tables as to arcs 1 and 34 of common radius and common lineal speed. The throw of the cam 36 may slow up the travel of the closed neck finish 18 to approximate the travel of the closed blow mold 35, but with the positive closing of the finishing mold 35, any shifting of the neck finish 18 relatively thereto is disastrous and accordingly at the region "D" motor fluid supply through line 37 to cylinder 38 thrusts piston rod 39 downward for taper cap 40 to slide over taper head 41, thereby bringing box section 28 into positively aligned registry with the closed blow mold 35 since the cylinder 38 is in positively aligned position thereover.

At once this cap 40 has seated on the taper portion 41 in aligning the neck finish 18 of the nipple box 28 by horizontal movement thereof, the blow mold 35 has come freely into fully closed position, thereby avoiding any distortion of the blank at this closing, while the neck finish 18 has positively held the blank in this transferring and the blank with the neck finish is now positively held with the closed blow mold for blowing operation to occur by pressure air supply through line 42, in bringing the blank to finish mold form initially before reaching station "B".

In this positive holding, the springs 31 yield for arm extension of the head to follow accurately the lineal and angular travel of the closed blow mold. As the first blowing operation is completed, primary air may be supplied by line 43 to retract the cap 40 as power air supplied to line 44 depresses cam guide 45 upon stem 46 against the resistance of spring 47 in thereby causing wedge 48 to open the neck finish 18 so that between "B" and "C" cam portion 49 may be effective in withdrawing the open neck finish from above the preliminarily finished ware in the mold 35.

Thereafter the travel is along cam portion 50. There may be reverse orienting of the arm and its extensions with cam portion 51 effective to bring this orienting transfer device back into cam portion 16 for cooperation with closed blank mold 17 for receiving a successive charge, forming such charge, and repeating this cycle of operations.

As the opened neck finish sections 18 have cleared the blow mold, the cam 45 may be retracted by power air supply through line 52.

In the thrusting down of the cap 40 upon the tapered portion 41, the blow mold 35 is approaching but may not be, in practice, fully at closed position, in order that the transfer mechanism may coact in insuring accurate alignment before the final closing. Accordingly, it is desirable that the pressure of this thrust be not one to interfere with the closing movement of the blow mold sections 35 as well as prevent any lost motion between the coacting parts. To this end the cap 28 is provided with extension 53 riding upon roller 54 carried by auxiliary bracket 55 adjustable by bolts 56 in slot 57 as to primary bracket 58 carried by arm 59 carrying cylinders for operating the cap 40 and the cam 45. This adjustment 56, 57, as well as the adjustment at the dovetail 21 permits of a nicety for locating the transferring mechanism from different molds of different heights as for different types of ware, as well as taking up any lost motion between the parts. Furthermore, the neck finish 18 is held clear of the blow mold 35, thus permitting either to open or close without offering resistance to the other.

In accordance with the present invention it is possible to engage a blank while still held in position with a blank mold, and effect a lateral shifting of such blank into a position where it may be engaged by a blow mold. The construction described also insures holding the blow mold and blank engaging means against relative movement in an angular or lineal direction, so that the blank engaging means, the blank and the blow mold are caused positively to travel in a predetermined or coordinated relationship during a definite path.

Destruction of this coordinated relationship, or the failure to maintain the same, permits relative movement between the blow mold and the blank engaging means such as to subject the neck of the blank to a lateral movement while still held by the engaging means, thereby producing checking or cracking of the neck. In accordance with the present invention such a relative movement, which has hereinbefore been referred to as disastrous, is prevented.

It will be apparent that while I have only illustrated one blank mold, the invention contemplates a plurality of blank molds as described in the Soubier patent referred to, and that the various operating mechanisms, other than those herein described in detail, may also be in accordance with the disclosure of said patent.

What is claimed and it is desired to secure by Letters Patent is:

1. In a glass forming machine, the combination of a blank mold carriage and a finishing mold carriage arranged side by side, a blank mold and a finishing mold carried by said carriages respectively, said carriages being rotatable in synchronism about vertical axes, transfer mechanism having permanent operating connections with the blank mold carriage and operable to transfer a parison from the blank mold and move it laterally into position to be enclosed by the finishing mold, a nipple box mounted with the transfer mechanism, spring means normally positioning the nipple box for shifting with the transfer mechanism, inter mold effective holding means anchoring the nipple box and opposing said spring means in causing the mechanism to travel with the finishing mold in an arc concentric with the arc of the finishing mold carriage a predetermined distance while holding the parison, and means for blowing the glass to final shape in the finishing mold, said transfer mechanism being mounted on one of said carriages.

2. In a glass forming machine, the combination of mold carriages spaced apart horizontally, said carriages being rotatable continuously about horizontally spaced vertical axes, a blank mold and a finishing mold carried respectively by said carriages, a neck mold, operating connections for moving the neck mold from a position in register with the blank mold to a position in the vicinity of the finishing mold, a nipple box, a pivot pin mounting said box for movement with said connections, spring means normally positioning said box axially over the neck mold, and inter mold effective holding means coacting with the nipple box for moving the neck mold forward to a predetermined distance with the finishing mold in a path concentric with the axis of the finishing mold carriage.

3. The combination of a blank mold carrier, a blank mold thereon, a finishing mold carrier, a finishing mold thereon, said carriers being arranged side by side and rotatable horizontally in opposite directions whereby the adjacent sides of the carriers are continuously moving in about the same direction, transfer mechanism operable automatically to transfer a blank from a blank mold to a finishing mold while the molds are moving in approximately the same direction, a nipple box, a pivot pin providing a vertical axis mounting for the nipple box in assembly with the transfer mechanism at the transfer position of the mechanism, and positive inter mold effective controlling means determining the position of the blank against shifting relatively to the blank enclosing in finishing molds during the transfer, said transfer mechanism comprising a holding device operable to engage and hold a blank before the blank is disengaged from the blank mold, said device including means acting upon the nipple box to control the mechanism to maintain its hold on the blank during said transfer for travel with the blank during the travel of the blank with the finishing mold through a predetermined distance after being positioned to be enclosed in the finishing mold and until after the finishing mold has enclosed the blank.

4. A glass forming machine comprising in combination a blank mold carrier and a finishing mold carrier arranged side by side, one rotating continuously and clockwise and the other rotating continuously and counterclockwise, so that the adjacent sides of said carriers are continuously moving in about the same direction, a blank mold on one of said carriers, a finishing mold on the other carrier, a partible neck mold cooperating with said blank mold, means controlled by the movement of the mold carriers for moving the neck mold and blank away from the blank mold, a nipple box, pivot bearing means providing a common vertical axis for the neck mold and the nipple box in a position in the vicinity of the path of the finishing mold, holding means for inter mold coaction for the neck mold at the closed finishing mold while the tables are moving, and means for thereafter opening said neck mold.

5. A glass forming machine comprising first and second carriers, molds thereon, and transfer mechanism therebetween embodying an arm, a nipple box, opposite acting leaf springs yieldably locating the nopple box, directing means from one carrier for acting upon the nipple box to locate the arm in the vicinity of a mold on the other carrier, and mold alignment determining holding means on the other carrier for the directed arm.

6. In a glass forming machine, the combination of continuously rotating blank and blow mold carriers, said carriers arranged side by side and spaced apart, blank and blow molds carried by the respective carriers, mechanism to transfer a charge of glass from an open blank mold to a cooperative blow mold, said blow mold being closable around the glass, and means to blow the glass in the blow mold, said transfer mechanism comprising a holding device, mounting connections for bringing the device into holding engagement with the charge of glass before the opening of the blank mold and holding it enclosed in the blow mold, whereby the glass is controlled until blown to finished form in the blow mold, said holding device being mounted on one of said carriers and permanently retained thereon throughout its operation, a nipple box horizontally movably mounted with the holding device, and means separate from the mounting connections and molds to cause a relative movement of the nipple box and holding device as to the carrier on which they are mounted such that the holding device will move with the mold on the other carrier and without movement of translation relative thereto during a blowing through the nipple box into the blow mold.

7. In a glass forming machine, the combination of a continuously rotating blank mold carrier, a blank mold carried thereby, a continuously rotating finishing mold carrier, a finishing mold carried thereby, said carriers arranged side by side and spaced apart, a neck mold mounted on the blank mold carrier beneath and in register with the blank mold, mounting connections for the neck mold to travel with the carrier, said connections and neck mold forming mechanism to transfer a blank from the blank mold to the finishing mold, a nipple box at the neck mold and movable horizontally with the neck mold relatively to the mounting connection, inter-mold coacting holding means effective through the nipple box movement relatively to the mounting connections to cause the neck mold to travel with the closed finishing mold while the blank is enclosed in the finishing mold and blown therein, means to blow the blank in the finishing mold, and means operative thereafter to release the neck mold.

8. In a glass forming machine, the combination of a continuously rotating carriage including a blank mold carrier, a blank mold carried thereby, a continuously rotating carriage including a finishing mold carrier, a finishing mold carried thereby, said carriers arranged side by side and spaced apart, a neck mold, mounting connections for the neck mold on the blank mold carriage beneath and in register with the blank mold including a pivot pin for the neck mold, a nipple box mounted by said same pivot pin for movement with the neck mold relatively to the mounting connections, said connections and neck mold forming mechanism to transfer the blank from the blank mold to the finishing mold comprising an arm and inversion means for the neck mold with the bare blank supported therein during said transfer, and additional nipple-box-engaging control against shifting between the molds effecting movement of said arm relatively to said inversion means.

9. In a glass forming machine, the combination of continuously rotating carriages including mold carriers, said carriers spaced apart horizontally, a blank mold and a finishing mold carried respectively by said carriers, a sectional neck mold, a pivot pin for the neck mold sections, mounting connections for the neck mold on one of said carriages, a nipple box also mounted on said pivot pin, and inter-mold effective directing means coacting with the nipple box to effect movement thereof relatively to the mounting means to cause said neck mold to register with the finishing mold, said mounting connections being effective to transfer a blank from the blank mold to the finishing mold, including inversion means for the neck mold with the bare blank located therein during said transfer, a blow head, and shiftable abutment-providing holding means for steadying the nipple box as acted upon by the blow head.

CLARENCE C. KINKER.